US011671452B2

(12) United States Patent
Halford

(10) Patent No.: US 11,671,452 B2
(45) Date of Patent: Jun. 6, 2023

(54) SECURE OVERLAY MULTICAST

(71) Applicant: Caliola Engineering, LLC, Colorado Springs, CO (US)

(72) Inventor: Thomas R. Halford, Colorado Springs, CO (US)

(73) Assignee: CALIOLA ENGINEERING, LLC, Colordo Springs, CO (US)

( * ) Notice: Subject to any disclaimer, the term of this patent is extended or adjusted under 35 U.S.C. 154(b) by 493 days.

(21) Appl. No.: 16/892,883

(22) Filed: Jun. 4, 2020

(65) Prior Publication Data

US 2021/0194928 A1 Jun. 24, 2021

Related U.S. Application Data

(60) Provisional application No. 62/949,822, filed on Dec. 18, 2019.

(51) Int. Cl.
*H04L 29/06* (2006.01)
*H04L 9/40* (2022.01)
*H04L 9/08* (2006.01)

(52) U.S. Cl.
CPC .......... *H04L 63/168* (2013.01); *H04L 9/0841* (2013.01); *H04L 63/0435* (2013.01); *H04L 63/0464* (2013.01); *H04L 63/065* (2013.01)

(58) Field of Classification Search
CPC . H04L 63/168; H04L 9/0841; H04L 63/0435; H04L 63/0464; H04L 63/065; H04L 65/4076; H04W 4/06; H04W 4/08; H04W 36/0007
See application file for complete search history.

(56) References Cited

U.S. PATENT DOCUMENTS

| 2005/0111453 A1* | 5/2005 | Mizutani | H04L 12/56 370/392 |
| 2012/0275457 A1* | 11/2012 | Bijwaard | H04L 12/185 370/390 |
| 2015/0104017 A1* | 4/2015 | Halford | H04W 12/041 380/270 |

(Continued)

OTHER PUBLICATIONS

Ayman, E. L. "A New Secure Group Management and Communication in End-System Multicast Protocol." IJCSNS 10.3 (2010) (Year: 2010).*

(Continued)

*Primary Examiner* — Yogesh Paliwal
(74) *Attorney, Agent, or Firm* — Martensen IP; Michael C. Martensen

(57) ABSTRACT

A system and method for cryptographically securing data communications between a group of networked devices establishes and maintains an overlay network at the Application Layer, on top of a unicast routing service provided at the Internetworking Layer. The overlay network provides first, the routes that are used to deliver multicast datagrams and second, the cryptographic keys used to secure multicast datagrams. A common cryptographic key is established between all members of each group, and end-to-end encryption ensures that multicast datagrams can be accessed only by authorized group members. In other embodiments, keys are established between pairs of adjacent devices in the overlay network, and hop-by-hop encryption ensures that multicast datagrams can be accessed only by overlay network members.

12 Claims, 4 Drawing Sheets

(56) References Cited

U.S. PATENT DOCUMENTS

2016/0127459 A1\* 5/2016 Qi .................. H04L 67/104
370/312

OTHER PUBLICATIONS

Yiu, W-PK, and S-HG Chan. "SOT: secure overlay tree for application layer multicast." 2004 IEEE International Conference on Communications (IEEE Cat. No. 04CH37577). vol. 3. IEEE, 2004. (Year: 2004).\*

\* cited by examiner

US 11,671,452 B2

SECURE OVERLAY MULTICAST

RELATED APPLICATION

The present application relates to and claims the benefit of priority to U.S. Provisional Patent Application No. 62/949,822 filed 18 Dec. 2019 which is hereby incorporated by reference in its entirety for all purposes as if fully set forth herein.

STATEMENT REGARDING FEDERAL SPONSORED RESEARCH OR DEVELOPMENT

The U.S. Government has a paid-up license in this invention and the right in limited circumstances to require the patent owner to license others on reasonable terms as provided for by the terms of M67854-18-C-6522 awarded by United States Marine Corps Systems Command.

BACKGROUND OF THE INVENTION

Field of the Invention

Embodiments of the present invention relate, in general, to network security and more particularly to secure data communications between a group of devices in a wired or wireless network.

Relevant Background

Many networking applications require a means to cryptographically secure data communications between a group of devices. In this context and for the purpose of the present invention, cryptographic security refers to three properties:

Data Confidentiality is understood to be the property that data is not disclosed to unauthorized devices. Data Confidentiality is typically provided via an encryption scheme using a cryptographic key that is only shared by authorized devices. Encryption schemes translate—or "encrypt"—a plaintext bit string into a ciphertext bit string that can only be recovered—or "decrypted"—with the correct key.

Data Integrity is understood to be the property that data is not modified in-transit between the sender and receiver. Data integrity is often provided via a message authentication code (MAC) scheme, again using a cryptographic key that is only shared by authorized devices. MAC schemes translate a plaintext bit string and a key into a tag that can only be generated by devices possessing the plaintext and key.

Data Source Authentication is understood to be the property that the source of data is verified. Digital signature schemes, which rely on public key cryptography, are often used to provide source authentication. Sources generate data signatures using private keys known only to them, and receivers verify the data and signature using a source-specific public key that is known to all devices in the network.

Military communications offer a plethora of example applications where data communications between a group of devices must be secure. Consider, for example, the scenario illustrated in FIG. 1, wherein an Unmanned Aerial Vehicle (UAV) 101 provides video surveillance 102 of a battlefield. Encrypted video data is transmitted to the soldiers on the ground 103 via wireless data links 104. This is an example of group data communications because all three soldiers on the ground require access to the same video feed. The video must be encrypted so that an adversary cannot also exploit the UAV asset yet remain accessible to each soldier. Data integrity and source authentication must be ensured so that the soldiers on the ground can trust the veracity of the data feeds.

The Internet of Things (IoT) also offers a plethora of example applications where data communications between a group of devices must be secured. Consider, for example, the scenario illustrated in FIG. 2 wherein every home on a block contains a network of IoT-enabled smart devices. Every house has a router 201 that facilitates communications between the devices within a home over a wireless mesh network 202. Those devices may share data as a group to optimize energy consumption within the home. To protect the privacy of the residents, the data communications within a given home must be cryptographically secured. However, summary data may be shared between houses over the wired Internet 203 connecting the routers to optimize energy consumption across the block. Four potential groups for secure data communications can thus be identified in FIG. 2: one for each home network 202 and a group comprising the three routers 201.

Secure data communications between a group of networked devices requires (i) a method for transporting datagrams between group members and (ii) a method for securing those datagrams in-transit. Recall a datagram is a basic transfer unit associated with a packet-switched network. One simple way to solve both problems is to conceptually split an N-device group into $N \times (N-1)/2$ pairs of devices. Datagrams can be transported from one device to another using the point-to-point—or "unicast"—routing service provided by the Internetworking Layer of the network protocol stack. The datagrams transported between each pair of devices can be encrypted using a cryptographic key that is known only to that pair of devices. Diffie-Hellman exchanges are the canonical technique for generating pairwise keys in networks.

Unfortunately, this simple solution is not desirable in situations where bandwidth is at a premium, to include most military communications and IoT applications. When bandwidth is constrained, it is preferable to employ point-to-multipoint—or "multicast"—routing when transporting datagrams between group members.

To understand the benefits of multicast for group communications, it is instructive to consider the wireless network illustrated in FIG. 3. In this example, a data source "S" 301 is connected to two data destinations ("D1" 302 and "D2" 303) via an intermediate relay device "R" 304. If the network does not support multicasting, then each datagram from S to D1 and D2 would require four transmissions. A first copy of the datagram destined for (addressed to) D1 would first be transmitted from S to R, and then re-transmitted from R to D1. A second copy of the datagram destined for D2 would next be transmitted from S to R, and finally re-transmitted from R to D2. Contrast these four transmissions with the two transmissions that would be required if the network supports multicast. In this case, a common copy of the datagram destined for both D1 and D2 would first be transmitted from S to R. The datagram would next be re-transmitted by R and received by both D1 and D2, since both of the destination devices are within wireless range of R.

Networks, whether wired or wireless, can support multicasting in multiple ways. For example, multicast functionality can be implemented at the Internetworking Layer, alongside the unicast routing functionality that is provided by the Internet Protocol (IP). This approach is known as "IP Multicast". Alternatively, multicast functionality can be implemented at the Application Layer, using an approach known as "End System Multicast". In End System Multicast, devices participating in a group communicate via an overlay network built on top of a unicast IP service. One of reasonable skill in the relevant art will appreciate that an overlay network is simply a network built on top of another network.

It has proven to be difficult to secure data communications between groups of devices at the Internetworking Layer for several reasons. First, the aforementioned Diffie-Hellman exchanges that can be used to establish keys between pairs of devices do not scale to groups of devices. Second, it is a security best practice, as would be appreciated by one of reasonable skill in the relevant art, to combine encryption with IP tunneling. In IP tunneling schemes, the header and payload of every packet at the Internetworking Layer are encrypted and the resulting ciphertext is transported with a header containing different, tunnel-specific source and destination IP addresses. This requires relaying devices (i.e., routers) in any path (route) IP multicast route between the source and destination(s) to understand the mapping between the original and tunnel IP headers. In large, dynamic networks, a non-trivial amount of bandwidth must be devoted to maintaining this network state.

In light of the above discussion, a need exists to cryptographically secure multicast data communications between a group of devices at the Application Layer. These and other deficiencies of the prior art are addressed by one or more embodiments of the presently disclosed invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

The present invention provides a system and corresponding methodology for cryptographically securing data communications between a group of networked devices. The system establishes and maintains an overlay network at the Application Layer, on top of a unicast routing service provided at the Internetworking Layer. The overlay network provides routes that are used to deliver multicast datagrams and the cryptographic keys used to secure multicast datagrams. In one embodiment of the present invention a common cryptographic key is established between all members of each group, and end-to-end encryption ensures that multicast datagrams can be accessed only by authorized group members. In other embodiments, keys are established between pairs of adjacent devices in the overlay network, and hop-by-hop encryption ensures that multicast datagrams can be accessed only by overlay network members.

According to one embodiment of the present invention, a multicast overlay communications network includes a plurality of devices configured as an overlay network for End System Multicast (ESM) communication at the network Application Layer. The system identifies one or more groups of devices within the overlay network wherein each group comprises a subset of the plurality of devices. One or more cryptographic keys are established and stored at the network Application Layer that are combined with an encryption/decryption protocol configured to encrypt/decrypt datagrams at the network Application Layer to secure communication between the one or more groups.

Other features of the multicast overlay communications network of the present invention include that communications between the groups of devices are secured with end-to-end encryption. In such an instance a different cryptographic key is shared with devices within each of the one or more groups.

In other embodiments of the multicast overlay communications network of the present invention communications between the one or more groups are secured with hop-by-hop encryption. In such an instance a different cryptographic key of the one or more cryptographic keys is shared between each pair of adjacent devices in the overlay network.

Communications between the one or more groups in the multicast overlay communications network can also be secured with a combination of end-to-end encryption and hop-by-hop encryption.

One version of the present invention uses a common control protocol operating at the network Application Layer to establish one or more ESM route(s) required for communication between the one or more groups, and the one or more cryptographic keys used to secure communications between the one or more groups.

In another version of the present invention a common data protocol operating at the network Application Layer encrypts datagrams using the encryption/decryption protocol and the one or more cryptographic keys, forwards datagrams across the overlay network according to one or more ESM route(s), and decrypts datagrams using the encryption/decryption protocol and the one or more cryptographic keys.

In an end-to-end version of the present invention one of the one or more cryptographic keys is used for encryption of datagrams transmitted by one or more of the devices in one or more groups of devices along the ESM route(s).

In a hop-by-hop version a different key of the one or more cryptographic keys is shared between each pair of devices that are adjacent in the overlay network and part of an ESM route for one of the one or more groups forming a set of keys. The set of keys are used for hop-by-hop encryption of datagrams transmitted by one or more devices of the one or more groups of devices along the ESM route(s). A key shared by adjacent devices can be used for hop-by-hop encryption of datagrams transmitted by one or more devices of the one or more groups of devices.

A method for secure multicast, overlay network communication, according to one embodiment of the present invention includes broadcasting, by one of a plurality of devices configured as an overlay network for ESM communication at a network Application Layer, a Group Establishment message, the message including a group IP address and a device IP address of each member of the group;

establishing a group of the plurality of devices wherein the group is associated with the group IP address;

responsive to receipt of the Group Establishment message, establishing, by each device of the group, one or more ESM route(s) required to transmit datagrams from each device of the group to every other device of the group; and responsive to receipt of the Group Establishment Message, establishing one or more cryptographic keys to encrypt/decrypt datagrams transmitted between devices of the group.

In such an end-to-end methodology the Group Establishment message identifies a device of the group as a group leader and the device IP addresses of the group leader. Once the Group Establishment message has been received, a group cryptographic key for end-to-end encryption of datagrams between devices of the group is securely transmitted by the group leader.

One feature of the present invention is that responsive to receipt of the Group Establishment message, the method includes transmitting, by a non-group leader device, a Group Key Request message to the group leader. The Group Key Request message initiates establishment of a secure point-to-point communications session between the non-group leader device and the group leader and requests the group leader transmit the group cryptographic key to the non-group leader device over the secure point-to-point communications session.

The secure point-to-point communications session between the non-group leader device and group leader can be, in one embodiment, established using a Diffie-Hellman key exchange.

In another embodiment of the present invention, upon receipt of the Group Establishment message, each pair of devices in the overlay network that are adjacent in one or more of the one or more ESM route(s) establishes a pairwise cryptographic key for hop-by-hop encryption of datagrams transmitted between members of the group. A new cryptographic key is generated between each pairs of adjacent devices that fail to share a pairwise cryptographic key.

The method for multicast, overlay network communication described above can also include, in another embodiment,
  selecting a group cryptographic key from the one or more cryptographic keys at a datagram source based on a destination address of a datagram;
  encrypting the datagram using the group cryptographic key yielding a ciphertext datagram;
  forwarding the ciphertext datagram to other members of the group according to a ESM routing table; and
  decrypting the ciphertext datagram at each member of the group using the group cryptographic key.

In another embodiment of the present invention, the method for secure multicast, overlay network communication described above, wherein each ESM route for transmission of a datagram includes a destination device having a destination IP address, a source device and a relay device, can include,
  identifying at each source device and at each relay device in an ESM route corresponding to the destination IP address of the datagram,
    one or more next hop IP addresses associated, respectively, with one or more next hop devices for the ESM route, and
    one or more pairwise cryptographic keys for secure communications, respectively, with the one or more next hop devices for the ESM route and the source device or the relay device;
  encrypting the datagram using each of the pairwise cryptographic keys, yielding one or more ciphertext datagrams;
  forwarding each ciphertext datagram to a next hop device based on the ESM route to the destination IP address; and
  decrypting the ciphertext datagram at each of the one or more next hop devices using the identified pairwise cryptographic key.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
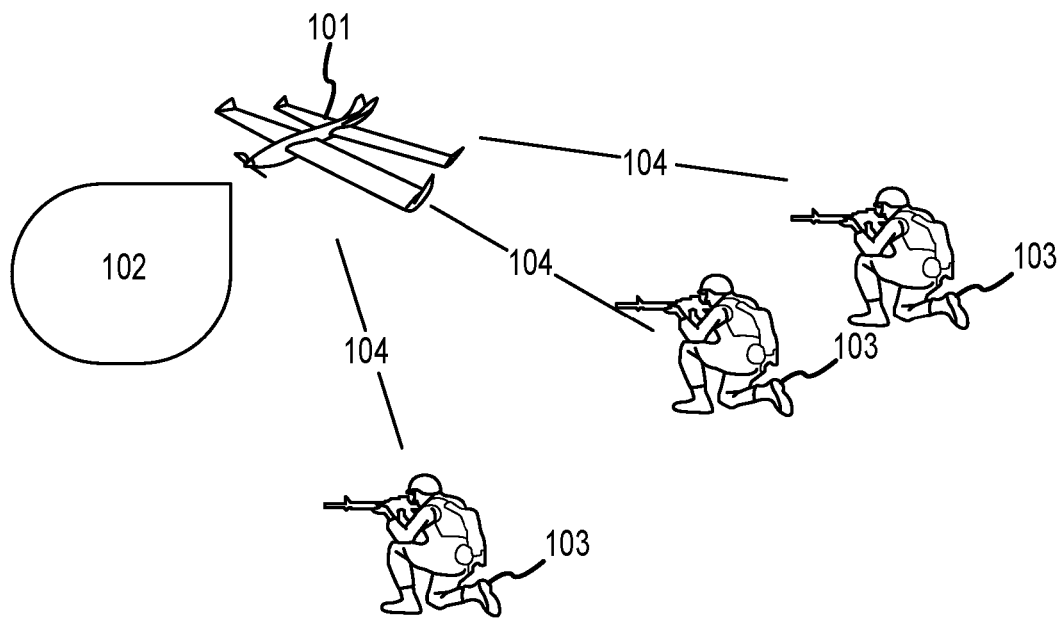
FIG. 1 presents a broadcast wireless transmission scenario as would be known in the prior art.
Figure 2:
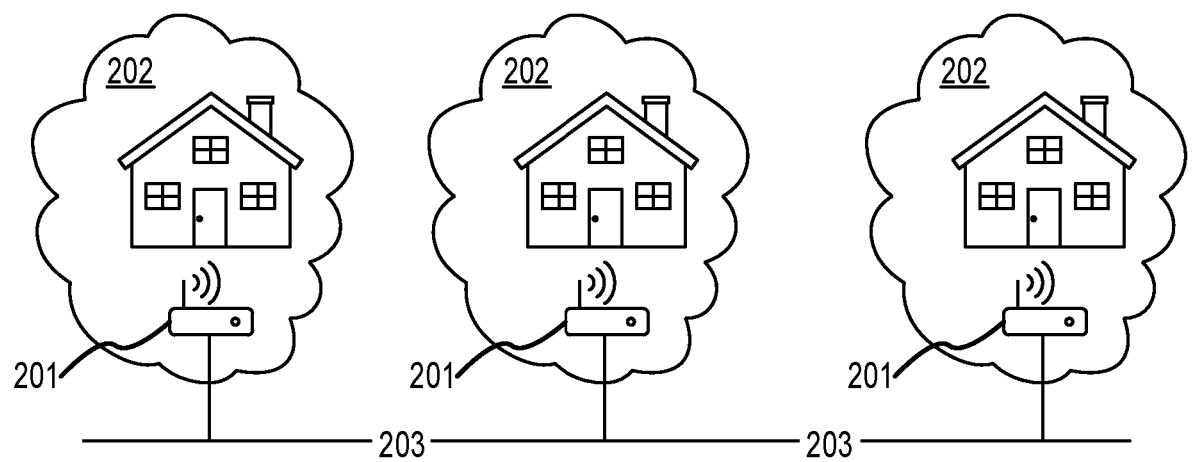
FIG. 2 presents a scenario of secured network communications between groups as would be known in the prior art.
Figure 3:
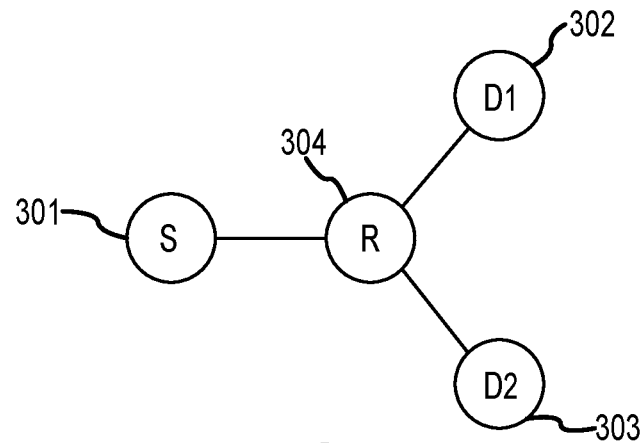
FIG. 3 is a high-level depiction of wireless network communication as would be known to one of reasonable skill in the art.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Cryptographically secure data communications between networked devices is hereafter disclosed by way of example. The present invention establishes and maintains an overlay network at the Application Layer, on top of a unicast routing service that is provided at the Internetworking Layer. The overlay network provides two or more services to other applications. First, it establishes the routes that are used to deliver multicast datagrams. Second, it establishes the cryptographic keys that are used to secure those multicast datagrams. In some embodiments, a common cryptographic key is established between all members of each group, and end-to-end encryption ensures that multicast datagrams can be accessed only by authorized group members. In other embodiments, keys are established between pairs of adjacent devices in the overlay network, and hop-by-hop encryption ensures that multicast datagrams can be accessed only by overlay network members.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The term "datagram" is meant as a basic transfer unit associated with a packet-switched network. Datagrams are typically structured in header and payload sections, with the header containing all of the control information required by the network to deliver the payload to its destination.

The term "TCP/IP" is meant as the Transmission Control Protocol/Internet Protocol suite of communication protocols used to interconnect network devices on the Internet.

The term "OSI" refers to the Open Systems Interconnection model that conceptually characterizes and standardizes the communication functions of a telecommunication or computing system without regard to its underlying internal structure and technology.

As one of reasonable skill in the relevant art will appreciate, there are numerous intermediary steps and conditions that must be meet for data to flow from one location to another. The OSI model is a system for communication between computing systems. By comparison, the TCP/IP model is, in essence, a concise version of the OSI model having five layers rather than the OSI's seven.

The OSI and TCP/IP models enable diverse communication systems to communicate using standard protocols. In plain English, the OSI and TCP/IP models provide a standard for different computer systems to be able to communicate with each other. It is based on the concept of splitting up a communication system into abstract layers, each one stacked upon the last.

The Application Layer of the OSI and TCP/IP models is the only layer that directly interacts with data from the user. Software applications like web browsers and email clients rely on the Application Layer to initiate communications. But client software applications are not part of the Application Layer; rather the Application Layer is responsible for the protocols and data manipulation that the software relies on to present meaningful data to the user. Application Layer protocols include HTTP (Hypertext Transfer Protocol) and SMTP (Simple Mail Transfer Protocol), which enable web browsing and email communications, respectively.

The Internetworking Layer for the OSI and TCP/IP models is responsible for facilitating data transfer between two different networks. This layer breaks up the datagrams from the Transport Layer, called segments, into smaller datagrams, called packets, on the sender's device, and reassembling these packets on the receiving device. The Internetworking Layer finds the best physical path for the data to reach its packet processing element; this is known as routing.

An "Overlay Network" is meant to be a telecommunications network that is built on top of another network and that is supported by its infrastructure. Nodes in the overlay network can be thought of as being connected by virtual or logical links, each of which corresponds to a path, perhaps through many physical links, in the underlying network.

"Unicast" refers to one-to-one communications wherein a single sender transmits datagrams to a single receiver.

"Multicast" refers to group communications wherein datagrams are transmitted to a group of destinations simultaneously.

"IP Multicast" refers to a telecommunications network paradigm wherein multicast related features such as group membership and multicast routing are implemented at the Internetworking Layer, alongside unicast routing.

"End System Multicast" (ESM) refers to a telecommunications network paradigm wherein multicast related features such as group membership and multicast routing are implemented at the Application Layer, on top of the unicast routing service provided by the Internetworking Layer. ESM is typically implemented in an overlay network that supports peer-to-peer communications.

While considering the drawings of the present invention recall that like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Included in the description are flowcharts depicting examples of the methodology which may be used to establish secure overlay multicast communications. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Upon reading this disclosure, those of skill in the art will appreciate still additional alternative structural and functional designs for a system and a process for secure overlay multicast communication through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The present invention establishes and maintains an overlay network at the Application Layer, on top of a unicast routing service that is provided at the Internetworking Layer. In one embodiment of the present invention, the overlay network provides three or more services to other applications. First, it establishes the routes that are used to deliver multicast datagrams. Second, it establishes the cryptographic keys that are used to secure those multicast datagrams. Third, it encrypts, forwards, and decrypts multicast datagrams that are securely transmitted between other applications.

In one embodiment of the present invention, End System Multicast is combined with cryptographic key exchange and cryptographic key transport protocols to cryptographically secure multicast data communications between a group of devices at the Application Layer. Group communications are secured with end-to-end encryption, with hop-by-hop encryption, or combinations thereof. In embodiments of the present invention described hereafter, multicast datagrams are encrypted end-to-end with cryptographic keys that are only shared with other members of the multicast group. In other embodiments, multicast datagrams are encrypted hop-by-hop with cryptographic keys that are shared between pairs of adjacent devices in the overlay network. In these embodiments of the present invention, multicast datagrams may be accessed by devices that are not a member of the multicast group, but which are overlay network members.

Secure Overlay Network Establishment

In one or more embodiments of the present invention, a set of devices establish an overlay network at the Application Layer, on top the unicast IP routing service that is offered by the underlying wired or wireless network. As would be recognized by one of ordinary skill in the relevant art, there are a multitude of ways in which an overlay network can be established and maintained. In some embodiments of the invention, devices participating in the overlay network periodically broadcast (flood) control messages containing a list of their one-hop neighbors across the overlay network. These one-hop neighbor tables are used to determine a graph representing the overlay network topology that is, in turn, used to determine the tables used to forward (route) unicast and multicast datagrams across the overlay network. In other embodiments, unicast routes in the overlay network correspond to shortest paths in the overlay graph, as determined using certain algorithms as would be known to one skilled in the relevant art. In these embodiments, multicast routes typically correspond to Shortest Path Trees (SPT) in the overlay graph, as determined using such an algorithm, or to approximations to SPTs determined using heuristic techniques.

At this point, it is instructive to consider a specific example as means of establishing the terminology used herein. Consider the seven-device network illustrated in FIG. 4. Four of the devices— "O1" 401, "O2" 402, "O3" 403, and "OR" 404—are members of an overlay network while the other three— "U1" 411, "U2" 412, "U3" 413— participate in an underlying IP network, but not in the aforementioned overlay network. Links in the underlying IP network are represented by solid lines, while dashed lines represent links in the overlay network. In this simple example, O1, O2, and O3 each have one one-hop neighbor in the overlay graph (OR), while OR has three one-hop neighbors (O1, O2, O3). Device OR 404 is a relay for every unicast and multicast route in the overlay.

In some embodiments, the source of the control messages that are used to establish the overlay network use a digital signature—or some other means, as would be recognized by one of ordinary skill in the relevant art—to provide a source authentication guarantee. This would be important when using hop-by-hop encryption, since any overlay device can, in principle, access the contents of any multicast datagram that it forwards.

Secure Overlay Multicast with End-to-End Encryption

In one embodiment of the present invention, a security policy for the network permits cryptographic keys to be shared by more than two devices. A cryptographic key shared by a plurality of devices is referred to as a group key. In these embodiments, group communications can be secured with end-to-end encryption as follows.

One device in the overlay network broadcasts a Group Establishment message to establish a group of devices 400, wherein the message contains three fields:

a. The IP address of the secure multicast group that is to be established.
b. The IP address of the multicast group member (device) who is responsible for generating the group cryptographic key. This group member is referred to as the group leader.
c. The IP addresses of the other, non-group leader members of the group, hereinafter referred to as group followers.

The initiator of the Group Establishment (GE) message may or may not be a member of the multicast group.

Figure 4:
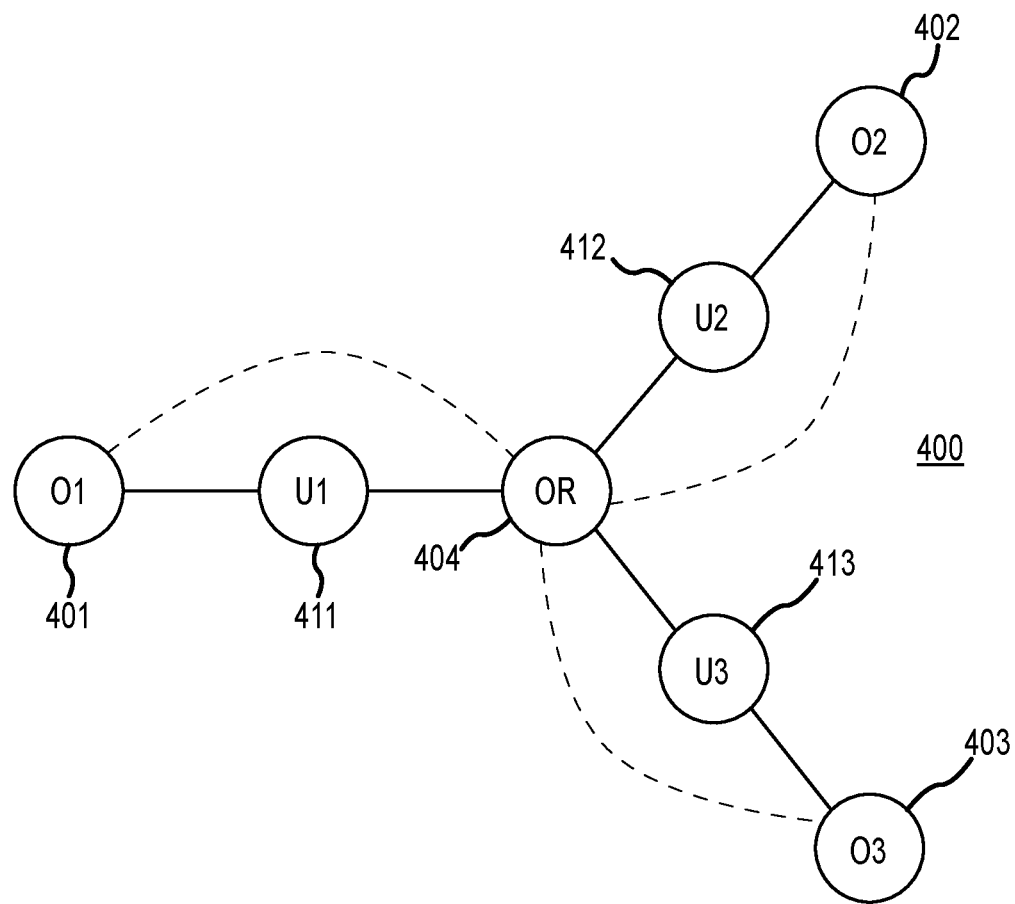
FIG. 4 illustrates an overlay multicast network according to one embodiments of the present invention depicting an overlay network topology and an End System Multicast routes.
Figure 5:
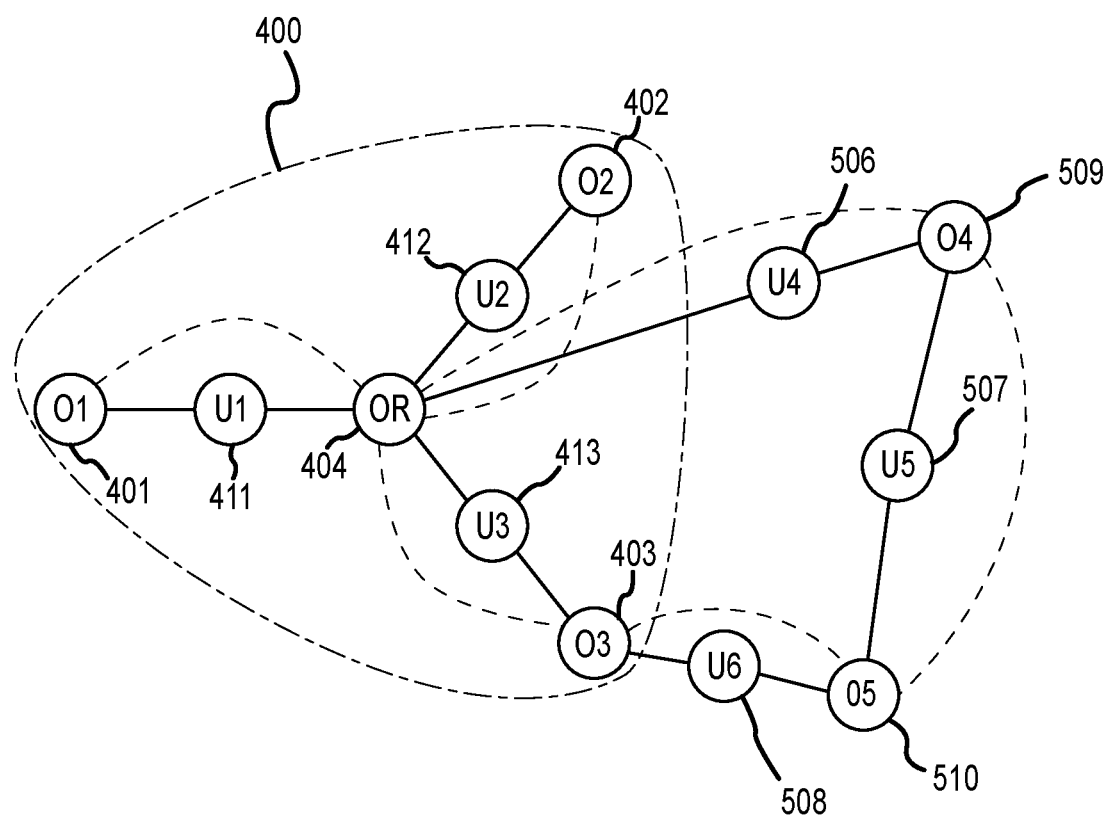
FIG. 5 illustrates an overlay multicast network according to one embodiment of the present invention identifying a group within a plurality devices of the overlay multicast network.
Figure 6:
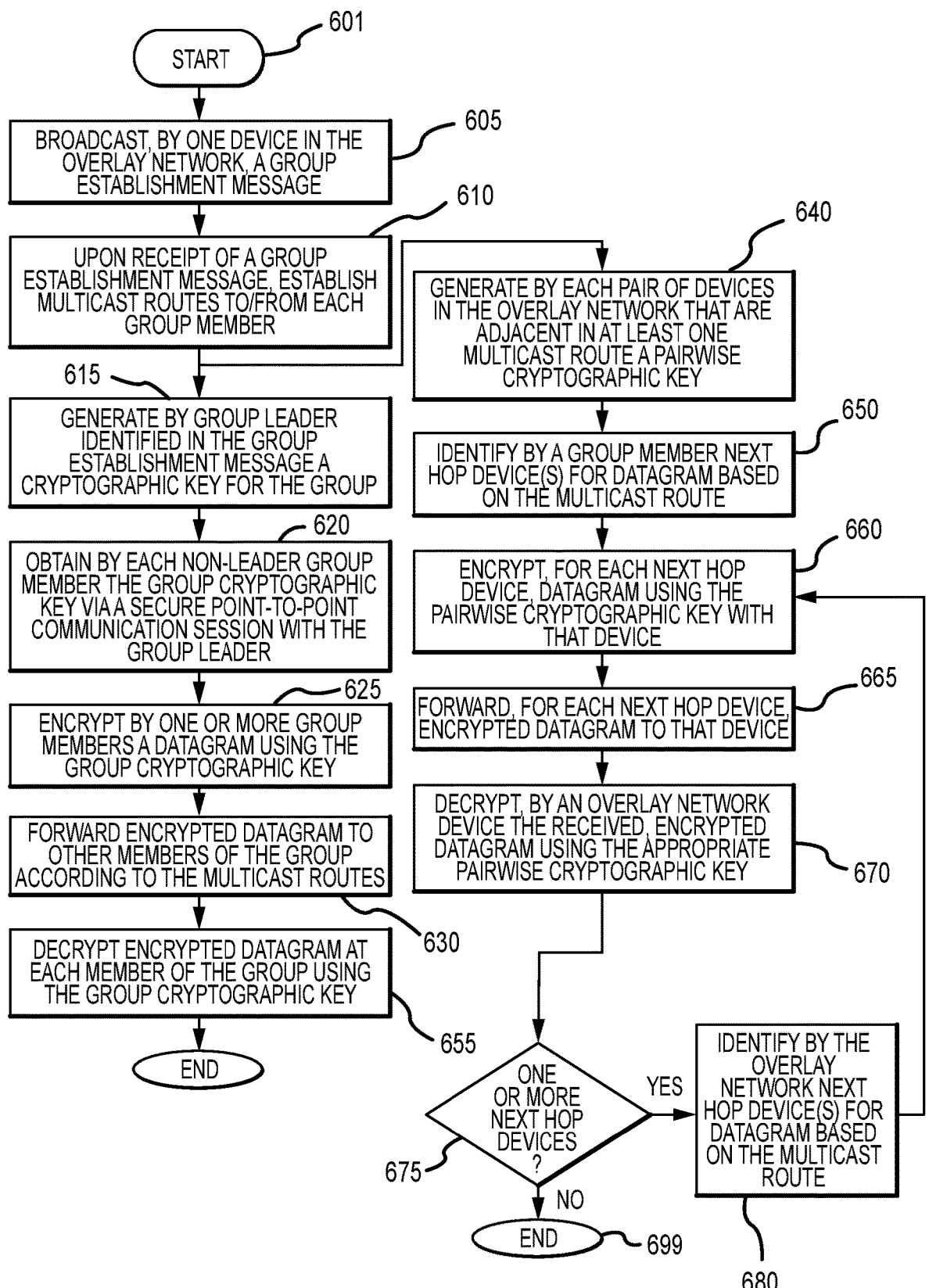
FIG. 6 is a flow chart of one embodiment of a methodology, according to the present invention, for secure overlay multicast communication.

Continuing the example from FIG. 4 and with reference to FIGS. 5 and 6, suppose that the network employs IP version 4 and that the addresses for devices O1, O2, O3, and OR are 10.0.0.1, 10.0.0.2, 10.0.0.3, and 10.0.0.18 respectively. Suppose further that device O1 wishes to establish a multicast group with address 239.0.0.1 between itself, O2, and O3. The fields of the GE message in this case would be: 1: 239.0.0.1; 2: 10.0.0.1; and 3: {10.0.0.2, 10.0.0.3}.

Upon reception of a GE message, every device in the overlay network establishes (F+1) multicast routes, where F is the number of group followers. Specifically, an End System Multicast route from each group member (source) to the other F group members (destinations) is established. An overlay network device that is not a group member may participate in one or more of the ESM routes established for that group as a relay. It is for this reason that the GE messages are broadcast to the entire overlay network, and not just the group members.

Continuing the example from FIG. 5, the overlay network devices of the multicast group 400 forward datagrams that are destined to IP address 239.0.0.1 according to the following rules. Device O1 401 forwards datagrams with source IP address 10.0.0.1 to 10.0.0.18. In this case, the underling network would forward datagrams to 10.0.0.18 via device U1 411, but this would be determined at the Internetworking Layer of O1 rather than the Application Layer. Similarly, O2 (resp., O3) 402 forwards datagrams from 10.0.0.2 (resp., 10.0.0.3) to 10.0.0.18 via device U2 412. Device OR 404 forwards datagrams with source IP address 10.0.0.1 to both 10.0.0.2 and 10.0.0.3. Similarly, OR 404 forwards datagrams with source IP address 10.0.0.2 (resp., 10.0.0.3) to 10.0.0.1 and 10.0.0.3 (resp., 10.0.0.2).

The transmission of datagrams within the multicast group 400 is independent of other devices (O4 509, O5 510) within the overlay network but outside of the established group. A plurality of groups can exist within an overlay network and each device within the overlay network may be a member of one or more multicast groups. FIG. 5 depicts the multicast group 400 of FIG. 4 in association with device O4 509 and O5 510. Devices U4 506, U5 507 and U6 508 reside in the underlying IP network acting as relays. While not part of the shown multicast group 400 they too could form a new group including (or not) devices O1 401, O2 402 and/or O3 403.

Continuing with the prior example, when the group leader receives a GE message—because it was not also the GE source—it responds by generating a new cryptographic key for that group. When the group leader is also the GE source, then it can generate the group key when preparing the GE message.

Upon reception of a GE message, each group follower initiates a secure, point-to-point communications session with the group leader. To this end, in some embodiments, the group follower transmits a Group Key Request (GKR) message to the group leader that initiates a Diffie-Hellman exchange. The resulting pairwise cryptographic key is used to encrypt a Group Key Transport (GKT) message containing the group key, which is then transmitted from the group leader to the group follower.

In some embodiments, it may be advantageous to have overlay network members that not group members respond to the GE message with a Group Acknowledgement (GA) message containing the IP address of the secure multicast group. In such embodiments, if the GE source does not receive a GA message from any such device within a prescribed timeout window, then it can retransmit the GE message. In this manner, reliable End System Multicast route establishment can be ensured.

Continuing the example from FIG. 5 wherein the group leader O1 401 was the source of the GE message, we accordingly consider how O2 402 and O3 403 respond to the GE message. Devices O2 402 and O3 403 will each send a GKR message to O1 401 requesting the key associated with the multicast group with IP address 239.0.0.1 400. These messages will trigger two independent, secure cryptographic exchanges, one between O1 401 and O2 402, and the other between O1 401 and O3 403. Device O1 401 will encrypt and transmit the group key to each device using a different pairwise key.

In another embodiment it may be advantageous to have each group follower respond to the GKT message with a Group Key Acknowledgement (GKA) message containing the IP address of the secure multicast group. In such embodiments, if the group leader does not receive a GKA message from a specific group follower within a prescribed timeout window, then it can retransmit the GKT message. In this manner, reliable group key exchange can be ensured.

In some embodiments of the present invention, the source of the GA, GE, GKR, and/or GKT messages that are used to establish the overlay network use a digital signature—or some other means, as would be recognized by one of ordinary skill in the relevant art—to provide a source authentication guarantee. Moreover, in one or more embodiments of the present invention a scheme such as a MAC may be used to ensure the data integrity of one or more of these messages.

Continuing the example from FIG. 5, suppose that the cryptographic key for the group with IP address 239.0.0.1 400 has been successfully exchanged with O2 402 and O3 403. Secure data communications between devices O1 401, O2 402, and O3 403 can now occur as follows. Suppose O2 402 is the source of a multicast datagram with destination 239.0.0.1 400. It is first encrypted at device O2 402 using the group key. The encrypted datagram is then forwarded to OR 404, which in turn forwards it to O1 401 and O3 403. It is then decrypted at devices O1 401 and O3 403 using the group key. Observe that since OR 404 does not possess the group key, it can forward, but not decrypt the encrypted datagram; this is therefore an example of end-to-end encryption.

Secure Overlay Multicast with Hop-by-Hop Encryption

In another embodiment of the present invention, a security policy for the network prohibits cryptographic keys from being shared by more than two devices. A key shared by exactly two devices is referred to as a pairwise key. In these embodiments, group communications can be secured with hop-by-hop encryption as follows.

Two variants of such embodiments can be identified. In "proactive" embodiments, pairwise cryptographic keys between neighboring devices in the overlay are generated as part of the overlay network establishment and maintenance protocol. Specifically, whenever a new neighbor is detected in the overlay network, secure cryptographic exchanges are triggered that generate the pairwise key that is used to encrypt data traffic between those neighboring devices. In "reactive" embodiments, pairwise cryptographic keys are only generated when needed to support a specific End System Multicast route.

In both proactive and reactive embodiments, one device in the overlay network broadcasts a GE message whose format is identical to that specified herein. Similar to the end-to-end encryption case, devices in the overlay network respond to GE messages by establishing multicast routes. When there is any link in the overlay network that is required for a multicast route for which there is not already a pairwise key established, then the pairwise key for that overlay link is generated via a Diffie-Hellman exchange.

Returning to the example in FIG. 5, suppose again that device O1 401 wishes to establish a multicast group with IP address 239.0.0.1 between itself, O2 402, and O3 403. It would broadcast a GE message containing the following fields across the overlay: 1: 239.0.0.1; 2: 10.0.0.1; and 3: {10.0.0.2, 10.0.0.3}. Upon reception of that message, multicast routes would be established as previously described. In a proactive embodiment, the required pairwise keys would already be in place and no further processing is required. However, in a reactive embodiment, the GE message would trigger the generation of three pairwise keys: K1 between O1 401 and OR 404, K2 between O2 402 and OR 404, and K3 between O3 403 and OR 404.

Continuing with this example, secure data communications between devices O1 401, O2 402, and O3 403 can now occur as follows. Suppose O2 402 is the source of a multicast datagram with destination IP address 239.0.0.1. It is first encrypted at device O2 402 using key K2. The encrypted datagram is then forwarded to OR 404, which decrypts it with K2. OR 404 then re-encrypts the datagram twice: once with key K1 and once with key K3. The resulting encrypted datagrams are forwarded to O1 401 and O3 403, respectively, who decrypt with K1 and K3. Observe that since OR 404 can access the plaintext in this case, it is an example of hop-by-hop encryption rather than end-to-end encryption.

It will also be understood by those familiar with the art, that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

FIG. 6 presents a flowchart of one embodiment of a methodology for secure multicast communication in an overlay network. As previously described, the process is initiated 601 by a device within an overlay network broadcasting 605 a group establishment message. Upon receipt of the message multicast routes are established 610 to and from each member of the group. In one embodiment, one of the members of the group, designated as the group leader in the Group Establishment message generates 615 a cryptographic key for the group. Using a secure point-to-point communication session with the group leader, each non-group leader member, or group follower, obtains 620 the cryptographic key for the group from the group leader.

Using the group cryptographic key, one or more members (devices) of the group thereafter encrypts 625 a datagram forming a ciphertext datagram and forwards 630 the ciphertext (encrypted) datagram to other members of the group according to the multicast routes. Upon receipt, each member of the group, using the group cryptographic key, decrypts 655 the encrypted datagram ending the process 699.

Upon receipt of the Group Establishment message and establishing 610 multicast routes to and from each member of the group, secure communication of datagrams can also be accomplished, in another version of the present invention, using hop-by-hop encryption. In such an instance each pair of devices in the overlay network that are adjacent in at least one multicast route generate 640 a pairwise cryptographic key.

In this version of secure multicast communication, a group member (device) identifies 650 next hop devices for datagram transmission based on the multicast route(s). For each next-hop device, the datagram is encrypted 660 forming a ciphertext datagram using the pairwise key with that next-hop device.

The ciphertext datagram is, thereafter, forwarded 665 to each next-hop device.

Upon receipt of the ciphertext datagram and using the appropriate pairwise cryptographic key, the encrypted (ciphertext) datagram is decrypted 670. The receiving device (member) in the overlay network then determines 675 whether there are one or more next-hop devices in the multicast route. When there are additional next-hop devices in the multicast route the device identifies 680 the next-hop device and encrypts 660 the datagram using the pairwise cryptographic key for that next-hop device. If there are no more next-hop devices in the multicast route the process ends 699.

The present invention provides a system and corresponding methodology for cryptographically securing data communications between a group of networked devices. The system establishes and maintains an overlay network at the Application Layer, on top of a unicast routing service provided at the Internetworking Layer. The overlay network provides routes that are used to deliver multicast datagrams and the cryptographic keys used to secure multicast datagrams. In one embodiment of the present invention a common cryptographic key is established between all members of each group, and end-to-end encryption ensures that multicast datagrams can be accessed only by authorized group members. In other embodiments, keys are established between pairs of adjacent devices in the overlay network, and hop-by-hop encryption ensures that multicast datagrams can be accessed only by overlay network members.

In a preferred embodiment, the present invention can be implemented in software. Software programming code which embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform particular tasks or implement particular abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

An exemplary system for implementing the invention includes a general purpose computing device such as the form of a conventional personal computer, a personal communication device or the like, including a processing unit, a system memory, and a system bus that couples various system components, including the system memory to the processing unit. The system bus may be any of several types of bus structures including a memory bus or memory controller, a peripheral bus, and a local bus using any of a variety of bus architectures. The system memory generally includes read-only memory (ROM) and random access memory (RAM). A basic input/output system (BIOS), containing the basic routines that help to transfer information between elements within the personal computer, such as during start-up, is stored in ROM. The personal computer may further include a hard disk drive for reading from and writing to a hard disk, a magnetic disk drive for reading from or writing to a removable magnetic disk. The hard disk drive and magnetic disk drive are connected to the system bus by a hard disk drive interface and a magnetic disk drive interface, respectively. The drives and their associated computer-readable media provide non-volatile storage of computer readable instructions, data structures, program modules and other data for the personal computer. Although the exemplary environment described herein employs a hard disk and a removable magnetic disk, it should be appreciated by those skilled in the art that other types of computer readable media which can store data that is accessible by a computer may also be used in the exemplary operating environment.

Embodiments of the present invention as have been herein described may be implemented with reference to various wireless networks and their associated communication devices. Networks can also include mainframe computers or servers, such as a gateway computer or application server (which may access a data repository). A gateway computer serves as a point of entry into each network. The gateway may be coupled to another network by means of a communications link. The gateway may also be directly coupled to one or more devices using a communications link. Further, the gateway may be indirectly coupled to one or more devices. The gateway computer may also be coupled to a storage device such as data repository.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

While there have been described above the principles of the present invention in conjunction with secure overlay multicast communications, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

I claim:

1. A method for multicast, overlay network communication, comprising:
    broadcasting, by one of a plurality of devices configured as an overlay network for End System Multicast (ESM) communication at a network Application Layer, a Group Establishment message, the Group Establishment message including a group Internet Protocol (IP) address and a device IP address of each member of a group;
    establishing the group of the plurality of devices wherein the group is associated with the group IP address;
    responsive to receipt of the Group Establishment message, establishing, by each device of the group, one or more ESM route(s) required to transmit datagrams from each device of the group to every other device of the group; and
    responsive to receipt of the Group Establishment message, establishing one or more cryptographic keys to encrypt/decrypt datagrams transmitted between devices of the group.

2. The method for multicast, overlay network communication of claim 1, wherein the Group Establishment message identifies a device of the group as a group leader and the device IP addresses of the group leader.

3. The method for multicast, overlay network communication of claim 2, responsive to receipt of the Group Establishment message, further comprising generating, by the group leader, a group cryptographic key for end-to-end encryption of datagrams transmitted between devices of the group.

4. The method for multicast, overlay network communication of claim 3, wherein, responsive to receipt of the Group Establishment message, further comprising transmitting, by a non-group leader device, a Group Key Request message to the group leader, wherein the Group Key Request message initiates establishment of a secure point-to-point communications session between the non-group leader device and the group leader, and
    requests the group leader transmit the group cryptographic key to the non-group leader device over the secure point-to-point communications session.

5. The method for multicast, overlay network communication of claim 4, further comprising establishing the secure point-to-point communications session between the non-group leader device and group leader using a Diffie-Hellman key exchange.

6. The method for multicast, overlay network communication of claim 4, wherein, responsive to receipt of the group key, the non-group leader device transmits an acknowledgement message to the group leader.

7. The method for multicast, overlay network communication of claim 1, responsive to receipt of the Group Establishment message, further comprising establishing, by each pair of devices in the overlay network that are adjacent in one or more of the one or more ESM route(s), a pairwise cryptographic key for hop-by-hop encryption of datagrams transmitted between members of the group.

8. The method for multicast, overlay network communication of claim 7, further comprising generating a new cryptographic key between pairs of adjacent devices that fail to share the pairwise cryptographic key.

9. The method for multicast, overlay network communication of claim 7, wherein the pairwise cryptographic keys are established using a Diffie-Hellman key exchange.

10. The method for multicast, overlay network communication of claim 1, wherein responsive to receipt of the Group Establishment message, devices that are not members of the group respond with an acknowledgement message.

11. The method for multicast, overlay network communication of claim 1, further comprising
    selecting a group cryptographic key from the one or more cryptographic keys at a datagram source based on a destination address of a datagram;
    encrypting the datagram using the group cryptographic key yielding a ciphertext datagram;
    forwarding the ciphertext datagram to other members of the group according to a ESM routing table; and decrypting the ciphertext datagram at each member of the group using the group cryptographic key.

12. The method for multicast, overlay network communication of claim 1, wherein each ESM route for transmission of a datagram includes a destination device having a destination IP address, a source device and a relay device and further comprising identifying at each source device and at each relay device in an ESM route corresponding to the destination IP address of the datagram, one or more next hop IP addresses associated, respectively, with one or more next hop devices for the ESM route, and one or more pairwise cryptographic keys for secure communications, respectively, with the one or more next hop devices for the ESM route and the source device or the relay device;

encrypting the datagram using each of the pairwise cryptographic keys, yielding one or more ciphertext datagrams;

forwarding each ciphertext datagram to an next hop device based on the ESM route to the destination IP address; and decrypting the ciphertext datagram at each of the one or more next hop devices using the identified pairwise cryptographic key.

* * * * *